(12) United States Patent
Martin

(10) Patent No.: US 7,236,209 B2
(45) Date of Patent: *Jun. 26, 2007

(54) METHOD AND APPARATUS FOR AUTOMATIC SELECTION OF VIDEO INTERFACE

(75) Inventor: Demian T. Martin, San Leandro, CA (US)

(73) Assignee: Monster Cable Products, Inc., Brisbane, CA (US)

( * ) Notice: Subject to any disclaimer, the term of this patent is extended or adjusted under 35 U.S.C. 154(b) by 551 days.

This patent is subject to a terminal disclaimer.

(21) Appl. No.: 10/389,018

(22) Filed: Mar. 14, 2003

(65) Prior Publication Data

US 2003/0147013 A1 Aug. 7, 2003

(51) Int. Cl.
*H04N 3/27* (2006.01)
*H04N 5/268* (2006.01)
(52) U.S. Cl. ..................... 348/554; 348/706
(58) Field of Classification Search ............... 348/706, 348/705, 554–558
See application file for complete search history.

(56) References Cited

U.S. PATENT DOCUMENTS 4,460,918 A * 7/1984 Flasza ........................ 348/554
4,660,073 A * 4/1987 Baumeister ................. 348/554
5,255,097 A * 10/1993 Spiero et al. ............... 348/706
6,559,893 B1 * 5/2003 Martin ........................ 348/554
6,774,953 B2 * 8/2004 Champion et al. .......... 348/651

* cited by examiner

*Primary Examiner*—Michael H. Lee
(74) *Attorney, Agent, or Firm*—LaRiviere, Grubman & Payne, LLP

(57) ABSTRACT

To permit the use of a single remote control device in an AV system that can supply incompatible video signals, a switch box (18) receives composite and S-video signals from an AV receiver, transforming these signals into the component video domain, and also receives component video signals from, e.g., a DVD player (14), with the output of the switch box being displayed on a television (16), and also receives a signal from a DVI source (101). The synchronization portion of the component video signal from the DVD player is sent to one of the input ports (14) of the AV receiver as a trigger signal for comparison thereof with the synchronization signal in the switch box (18). When a user selects the AV receiver input port into which the trigger signal is input, the sense signal at the switch box (18) is identical to the synchronization signal of the component video, and the switch box (18) consequently sends the component video to the television (16). Otherwise, one of the video signals from the AV receiver (14) is sent to the television (16). If a DVI display (114) is present, analog signals fare converted and scaled to produce a DVI signal suitable for display (114).

15 Claims, 4 Drawing Sheets

METHOD AND APPARATUS FOR AUTOMATIC SELECTION OF VIDEO INTERFACE

RELATED APPLICATIONS

The present application claims benefit under 35 U.S.C. 120 to U.S. application Ser. No. 09/201,374 filed January Nov. 30, 1998.

TECHNICAL FIELD

The present invention relates generally to video receivers, and more particularly to methods and systems for selecting between incompatible video formats in a way that is transparent to the user.

BACKGROUND ART

To produce a color video image, the image from the camera is broken down into its component primary colors, namely, red, green, and blue, and then combined and transmitted to a receiver which essentially reverses the operation of the camera to render the image sought to be displayed. To reduce the amount of information that must be transmitted and thereby advantageously conserve transmission bandwidth, older video formats use transmission schemes, including so-called "composite" video and "S-video", in which only one line (in the case of composite video) or two lines (in the case of S-video) are used to carry the color video signal to the receiver. Digital video has now arrived on the scene and has been declared the standard for High Definition Television (HDTV). The standard is the Digital Video Interface Standard (DVI). DVI signals are basically incompatible with analog systems of any type and must be decoded and subjected to conversion. Many large plasma displays are adapted for DVI input.

Unfortunately, however, while the first two of the above-mentioned formats conserve bandwidth, they do so at the expense of image resolution. Accordingly, a relatively new format, referred to herein as "component video", has been introduced. In component video, the three primary color images are transmitted along respective lines, thereby increasing the resolution and, hence, quality of the video image that is output by the receiver. Many digital video disk (DVD) players that provide relatively large bandwidth and, thus, that facilitate the use of component video, accordingly employ the component video format.

To accommodate all three of the above-mentioned formats, many modern televisions can accept composite video inputs, S-video inputs, and component video inputs. HDTV sets and players have recently added a DVI input to the above mix. To select among the inputs, however, a user must manipulate the local or remote control of the television itself to cause a menu of selections to appear on screen, and then the user must select which input is desired to be presented. This can be comparatively cumbersome.

Moreover, many television sets receive their input from an audio video (AV) receiver such as, e.g., the AV receiver associated with a video cassette recorder (VCR). Because many if not most AV receivers are configured only for the composite video and S-video formats and not for component video, however, the component video input to the television cannot be received through the AV receiver. Instead, it must be received as an input that is separate from the AV receiver. As one consequence, multiple remote control sets (e.g., one for the AV receiver and one for the television) are required.

As users have discovered, the requirement to use multiple remote control units is annoyingly cumbersome and confusing, and multiplies the likelihood that a remote control unit will be lost or misplaced.

Fortunately, the present invention recognizes that is possible to provide a means for controlling the presentation of incompatible video formats in a way that is transparent to the user, using AV receivers that are not otherwise configured for the component video format. Accordingly, it is an object of the present invention to provide a system and apparatus for controlling the presentation of incompatible video formats in a way that is transparent to the user. Another object of the present invention is to provide a system and apparatus for enabling a user to switch between video channels having incompatible formats using only a single remote control unit. Still another object of the present invention is to provide an AV selection system and apparatus that is easy to use and cost-effective to manufacture.

The device is further operative for selecting a Digital Video Interface (DVI) signal when received.

Other features of the present invention are disclosed or apparent in the section entitled: "MODES FOR CARRYING OUT THE INVENTION."

DISCLOSURE OF INVENTION

A video selection system is disclosed for selectively outputting signals to an audio video (AV) output device that includes a video display. The system includes a switch box configured for receiving at least one S-video signal and/or at least one composite video signal, and at least one component video signal, with the component video signal including a synchronization signal and at least one DVI signal. In accordance with the present invention, the switch box selectively outputs, to the AV output device, either the component video signal or one of the S-video and composite video signals and at least one DVI signal, based on the synchronization signal.

In a preferred embodiment the AV receiver provides a sense signal to the switch box, and the sense signal is compared to the synchronization signal to determine which video signal to present on the AV output device. The switch box is disclosed in combination with the AV receiver, which is configured for receiving the S-video input and/or the composite video input and sending these inputs to the switch box.

To establish the sense signal, the switch box sends the synchronization signal from the component video source to a first input port of the AV receiver to establish a trigger signal. When the first input port of the AV receiver is selected, the trigger signal establishes the sense signal that is input to the switch box.

Additionally, the switch box includes a video decoder for receiving one of the S-video signal and/or composite video signal to output a video signal that has been transformed to the component domain. A switch is electrically connected to the video decoder for receiving the transformed video signal therefrom, and the switch also receives the component video signal. When the sense signal from the AV receiver matches the synchronization signal from the component video source, the switch outputs the component video source signal; otherwise, the switch outputs the AV receiver video signal. In either case, the switch operates in the component domain.

To execute the above-described operation, a controller is in the switch box, in communication with the switch, for controlling the switch to establish the switch output. As disclosed in detail below, the controller includes a comparator for comparing the sense signal to the synchronization signal. Also, the controller includes a valid video determiner for causing the S-video signal or composite video signal to be sent to the AV output device when the S-video signal or composite video signal is valid and the sense signal does not match the synchronization signal.

Desirably, a remote control device is associated with the AV receiver. The remote control device is operable to select the first input port of the AV receiver to thereby cause the AV output device to present an image generated by the component video signal.

In another aspect, a method is disclosed for causing a video output device to present an image from a component video source or from a combined S-video and composite video source. The method includes electrically connecting the component video source and the combined S-video and composite video source to the video output device. Also, the method includes establishing an input port of the combined S-video and composite video source to be a trigger port. A synchronization signal is derived from the component video source and sent to the trigger port. Then, an input port of the combined S-video and composite video source, other than the trigger port, can be selected by the user to thereby cause the output device to present an image from the combined S-video and composite video source. Or, the trigger port of the combined S-video and composite video source can be selected by the user to thereby cause the output device to present an image from the component video source.

In still another aspect, a video selection device includes first video input ports including at least one of: one or more composite video input ports, and one or more S-video input ports. The device of the present invention also includes at least one component video input port. Furthermore, the device includes a video decoder that is electrically connected to at least one of the first video input ports, such that the decoder processes a video input into the component domain.

A switch is electrically connected to the video decoder for receiving the output from the decoder, and the switch is also electrically connected to the component video input port. As disclosed in detail below, a controller is electrically connected to one or more of the video input ports and to the switch, and the switch selectively outputs a signal from one of: a first video input port, and the component video input port, in response to the controller.

The device further includes circuitry for determining when a DVI signal is present at the appropriate input. When such a signal is present, the circuit switches from an analog video mode into a digital video mode. The circuitry further encodes and scales analog video into DVI protocol for presentation on a DVI display. The circuitry further includes means for generation of virtual synchronization signals. Finally, the device is further operative to scale and overlays on source video display information from the receiver to the DVI video stream.

The details of the present invention, both as to its structure and operation, can best be understood in reference to the accompanying drawings, in which like reference numerals refer to like parts.

BRIEF DESCRIPTION OF THE FIGS.

For a fuller understanding of the present invention, reference is made to the accompanying drawings in the following detailed description of the Best Mode of Carrying Out the Invention. In the drawings.

MODES FOR CARRYING OUT THE INVENTION

The present invention allows integration and display of different video formats, and specifically composite, S-video, DVI signals, and component video signals, in a way that is transparent to the user. Among other advantages, the present invention facilitates the use of a single remote control device to select one of a plurality of incompatible video signals from more than one video source.

Figure 1:
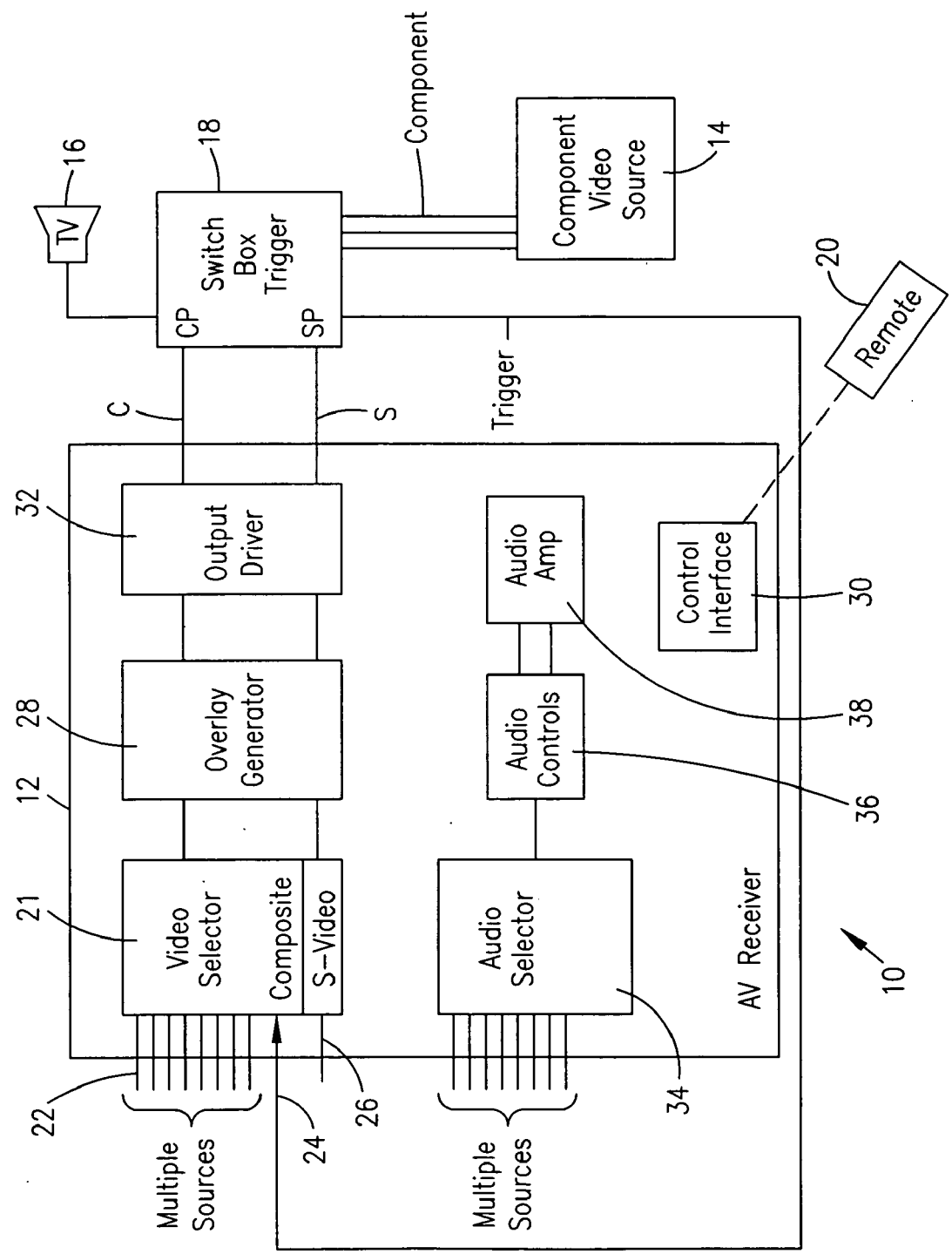
FIG. 1 is an electrical block diagram of the video signal receiving and integrating system according to the present invention.

Referring initially to FIG. 1, the present system is shown, generally designated 10, including an audio video (AV) receiver 12, a component video source 14 such as a digital video disk (DVD) player, an AV output device 16 such as a conventional television set or high density television (HDTV) set, and a switch box 18. Also, the system 10 can include a remote control device 20 that is associated with the AV receiver 12 for controlling the AV receiver 12 in accordance with well-understood principles.

As intended by the present invention, the AV receiver 12 can be a conventional AV receiver capable of supplying both composite video signals and S-video signals to the AV output device 16. Also, the component video source 14 can be a conventional component video source capable of supplying component video signals to the AV output device 16. As described in detail below, however, owing to the use of the novel switch box 18, a user is not required to manipulate the controls of the AV output device 16 to select between the AV receiver 12 and component video source 14. Rather, as set forth below a user can control which system 10 signal is displayed on the AV output device 16 simply by manipulating one and only one remote control device, namely, the remote control device 20 that is associated with the AV receiver 12.

As shown in FIG. 1, the AV receiver 12 includes a video input element 21 having plural composite video input ports, represented by lines 22, for receiving respective composite video inputs thereon. Per the present invention, one of the composite input ports establishes a trigger signal input port 24 for purposes to be shortly disclosed. Composite video signals are supplied to the composite video input ports 22 from respective conventional composite video sources as indicated in FIG. 1. These composite video sources can be conventional television channels. Also, the AV receiver 12 includes at least one S-video input port 26 for receiving signals from a conventional S-video source, e.g., certain video cameras. It is to be understood that if desired, the trigger signal input can alternatively be established by an S-video input port 26.

In accordance with principles known in the art, the signals from the video input element 21 are sent to an overlay generator 28. In response to user manipulations of a control interface 30 or in response to user manipulations of the remote control device 20, the overlay generator 28 superimposes graphics on the video signal for display therewith on the AV output device 16. These graphics represent the selected channel, volume, and other data.

From the overlay generator 28, the video signal is sent to a conventional output driver 32. As is known in the art, the output driver 32 establishes a video buffer. The signal that originated at a user-selected one of the input ports 22, 24 is sent from the output driver 32 to a composite port "CP" of the switch box 18 via a composite video line "C". Moreover, the S-video signal that originated from the S-video input port 26 is sent from the output driver 32 to an S-video port "SP" of the switch box 18 via an S-video line "S".

On the other hand, the component video signal from the component video source 14 is sent via three lines labeled "component" directly to a component video port of the switch box 18 without passing through the AV receiver 12, because the component video format is incompatible with the particular AV receiver 12 shown in FIG. 1. Additionally, a trigger signal is sent from the switch box 18 to the trigger signal input port 24 of the AV receiver 12 along a line labeled "trigger", for novel purposes to be shortly disclosed.

Completing the description of FIG. 1, the AV receiver 12 conventionally includes an audio processor including an audio selector 34 for selecting the audio signal corresponding to the video input selected from the video input element 21, audio controls 36 for establishing a desired volume, and an audio amplifier 38. It is to be understood that an audio signal from the component video source 14 can be sent to the audio selector 34.

From the above discussion, it will readily be appreciated that the AV receiver 12 undertakes no format conversion of the video signals. More particularly, the AV receiver 12 does not convert the one- or two-line video signals into the three-signal component domain. Instead, the AV receiver 12 enables selection of the desired input from the plurality of video input ports 22, 24, 26, and then outputs the signal to the switch box 18 in the format supplied to the AV receiver 12, based on the user's selection. Accordingly, it is to be understood that the output of the AV receiver 12 to the switch box 18 is in the same video format as the corresponding input, i.e., either composite video, S-video, or the trigger signal from the trigger signal input port 24 described more fully below.

Figure 2:
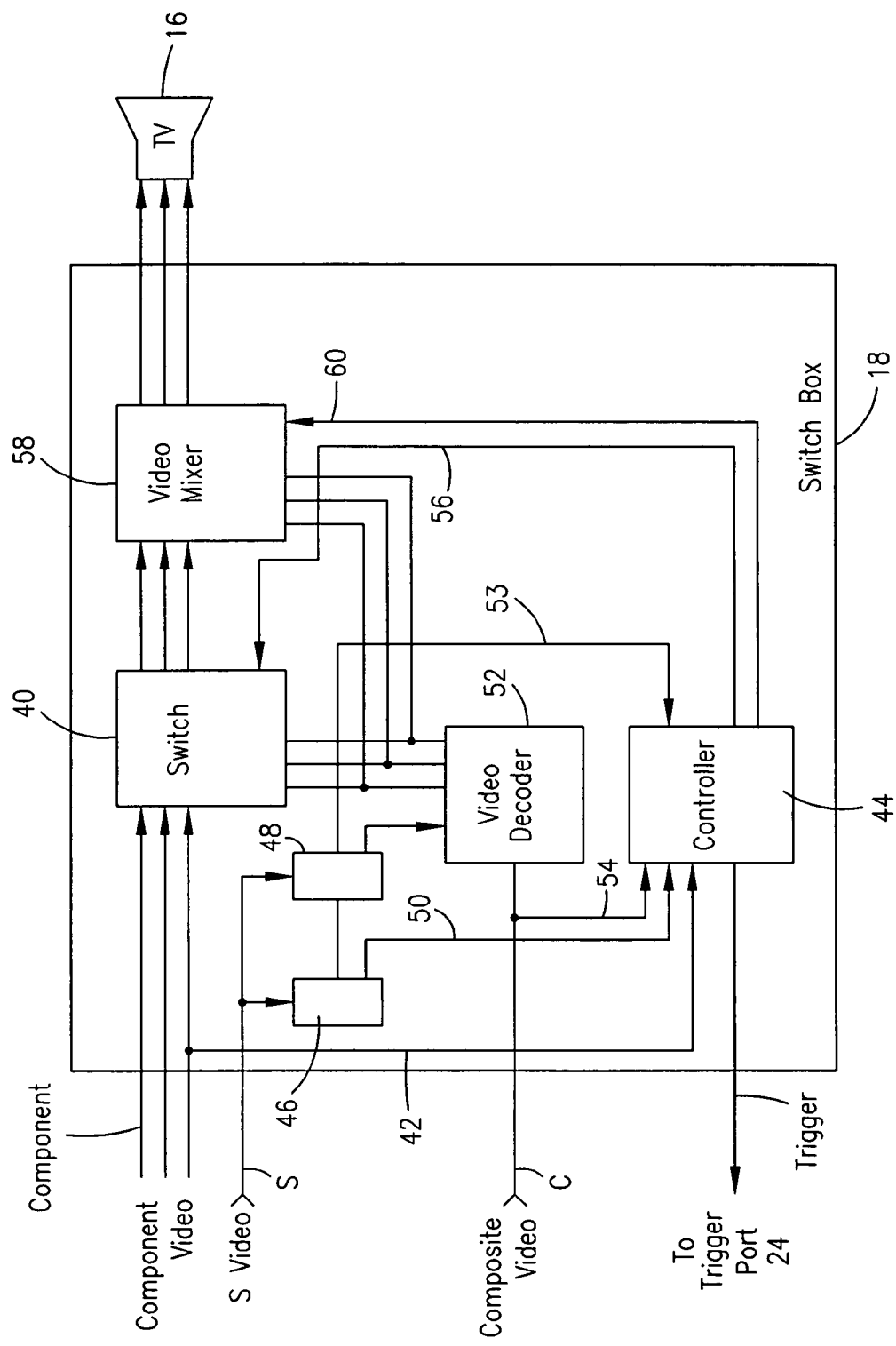
FIG. 2 is a block diagram of the switch box of FIG. 1.
Figure 3:
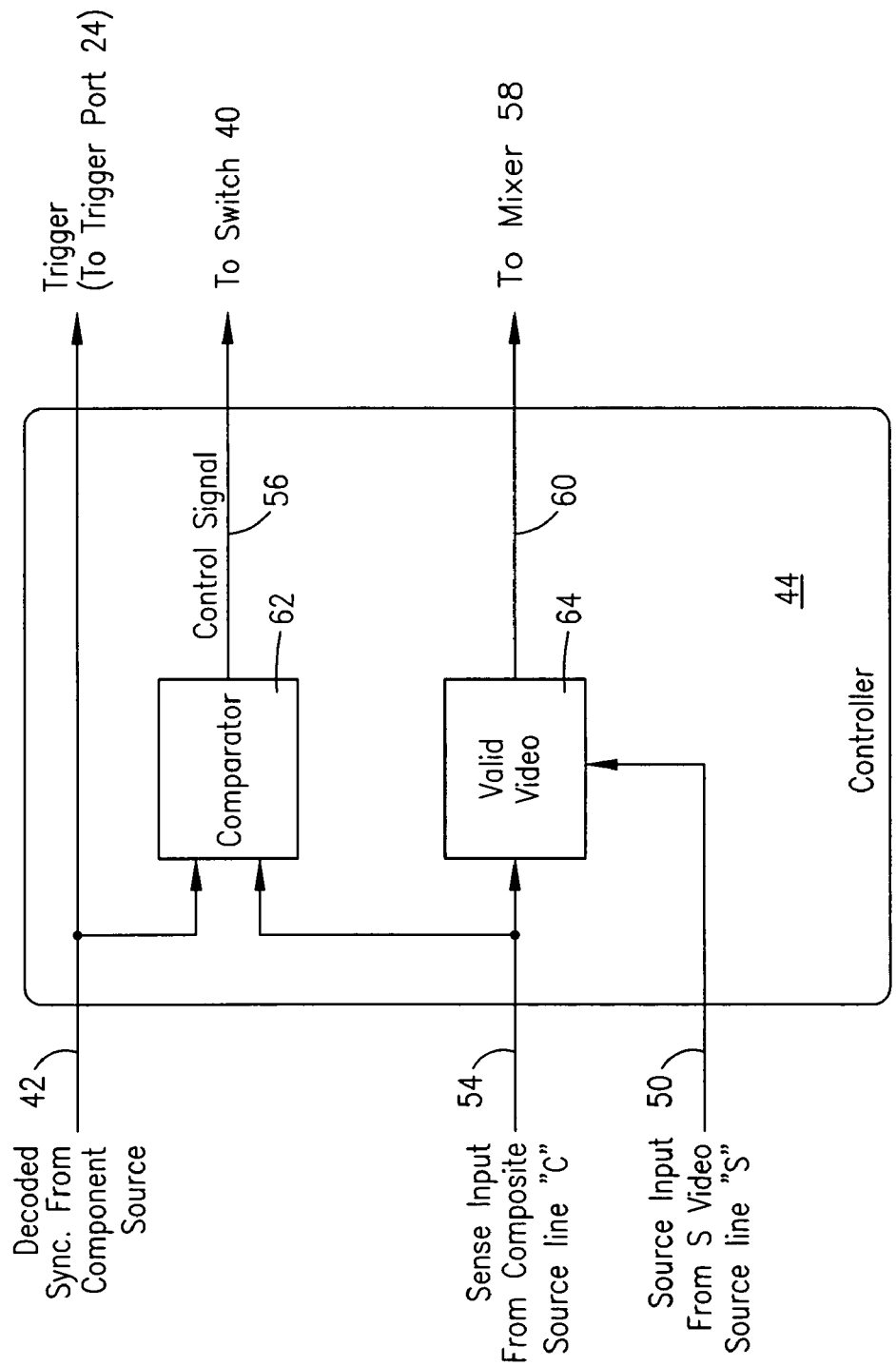
FIG. 3 is a block diagram of the controller of FIG. 2.

Referring now to FIGS. 2 and 3, the details of the switch box 18 can be understood. As shown best in FIG. 2, the signal on the component line is sent to a switch 40 in the switch box 18. The component video signal from the component video source 14 includes a synchronization signal, and the synchronization signal is sent via a "synch" line 42 to a controller 44.

FIG. 2 shows that the S-video signal on the line "S" is sent to first and second adders 46, 48 for processing the S-video signal in accordance with well understood principles. The output of the first adder 46 is sent to the controller 44 via a first S-video strip line 50 as shown, and the output of the second adder 48 is sent to a video decoder 52 and to the controller 44 via a second S-video strip line 53. The video decoder 52 is a conventional decoder which transforms S-video and composite video into the component domain, also referred to as the "RGB" domain after the three primary colors, red, green, and blue, which combine to form a color image. With this in mind, the video decoder 52 also receives the signal on the composite video line "C" as shown, for transformation of composite video signals thereon into the component domain.

As was the case with the S-video signal, the signal on the composite video line "C" is sent to the controller 44, but via a composite strip line 54. In turn, the controller 44 sends a trigger signal to the trigger signal input port 24 (FIG. 1) via the trigger line "trigger". Additionally, the controller 44 sends a control signal to the switch 40 via a control line 56. If desired, this control signal is also sent to a video mixer 58 via a line 60. The video mixer 58 overlays control graphics onto the video image displayed on the AV output device 16 in accordance with well-known principles.

Importantly, FIG. 2 shows that the output of the video decoder 52 is sent to the switch 40 and video mixer 58. Thus, the switch 40 receives both the component video signal from the component video source 14 (FIG. 1), and, from the video decoder 52, the component domain versions of the signals that originated at the composite video input ports 22 and S-video input port 26 of the AV receiver 12. In accordance with the present invention, the switch 40 responds to the control signal from the controller 44 to selectively pass on to the AV output device 16 either the signal from the component video source 14 or from the AV receiver 12.

In either case, the skilled artisan will readily appreciate that the switch 40 functions to select an output signal from two input signals, both of which are in the component domain. Accordingly, it may now be understood that the AV output device 16 need not be manipulated or controlled by the user in selecting between component video format and non-component video format. Instead, the AV output device can be permanently configured for the component format, with switching between the video signals from the AV receiver 12 and component video source 14 being effected transparently to the user inside the switch box 18, in response to the control signal from the controller 44.

FIG. 3 shows the means by which the controller 44 effects the above-described operation. The signal on the "C" line from the AV receiver establishes a sense signal that is received by a comparator 62 via the composite strip line 54. Also, the comparator 62 receives the synchronization signal from the component video source 14 that is present on the "synch" line 42. As shown in FIG. 3, it is the synchronization signal that is sent back to the AV receiver 12 on the "trigger" line. Stated differently, the synchronization signal establishes the trigger signal that is input to the trigger signal input port 24 of the AV receiver 12.

The comparator compares the sense signal to the component synchronization signal. If the user has selected the trigger signal input port 24 of the AV receiver 12 by, e.g., appropriately manipulating the remote control device 20, the sense signal will be the trigger signal. Consequently, the sense signal will match or otherwise be correlated to the synchronization signal, which, it will be recalled, is sent to the AV receiver 12 as the trigger signal. Under these circumstances, the comparator 62 outputs a control signal that causes the switch 40 (FIG. 2) to select the signal from the component video source 14 to be passed on to the AV output device 16. Otherwise (i.e., when the sense signal is not correlated to the synchronization signal), the comparator 62 outputs a control signal that causes the switch 40 (FIG. 2) to select the signal from the video decoder 52 (i.e., a video signal that originated from the AV receiver 12) to be passed on to the AV output device 16. Thus, by selecting the appropriate input port of the AV receiver 12, the user can cause either a video signal from the AV receiver 12, or the signal from the component video source 14, to be presented on the AV output device 16.

Completing the present description, a valid video determiner 64 receives the selected one of the signals on the composite strip line 54 and the first S-video strip line 50. It is to be understood that the valid video determiner 64 can alternatively receive the signal on the second S-video strip line 53 (FIG. 2). In accordance with present principles, when the valid video determiner 64 determines that the signal input thereto is valid, it passes this signal on for display when the switch 40 is configured to pass a signal from the AV receiver 12. In one embodiment, the valid video determiner 64 undertakes its test by determining whether the video signal input to it is characterized by conventional video signal properties such as frequency, frame refresh rate, pixel changes, and so on.

Figure 4:
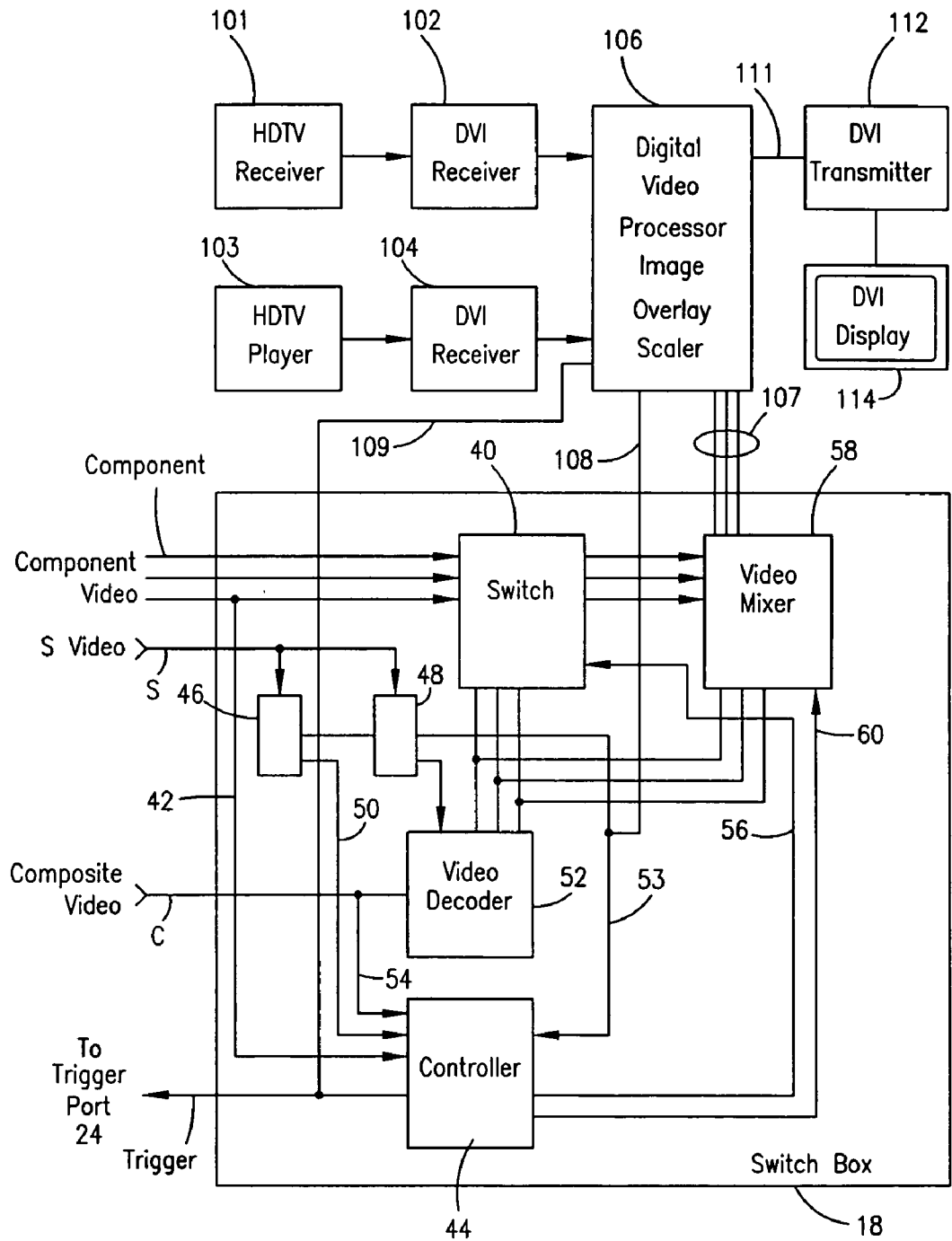
FIG. 4 is a block diagram of a second embodiment of the invention.

FIG. 4 is a block diagram of a second embodiment of the invention. Identical numbers are used for components already described in the above discussion. This embodiment includes the circuitry necessary to process and switch DVI signals and appropriately present analog video signals to a DVI interface. In this embodiment a HDTV receiver 101 is connected to a DVI receiver 102. A HDTV player 103 may be also used or substituted as a source of a DVI signal. The input of a DVI receiver 104 is connected to DVI player 103. The outputs of DVI receiver 102 and 104 are connected to the Digital/Video Processor 106.

Digital/Video Processor 106 contains circuitry to perform several functions. The circuitry may either be dedicated hardwired circuits or preferably software and a microprocessor programmed to perform the following functions. The first function is to switch between DVI and analog video. If an analog signal is received at input 107 and a control signal at input 108, Digital/Video Processor 104 switches into the analog mode. In the analog mode Digital/Video Processor 104 performs an analog to digital conversion and encodes the analog signal into DVI format. The signal is further scaled to produce a signal suitable for the higher resolution of a DVI display. Digital/Video Processor 104 further produces a virtual synchronization signal at output 109 for activation of sync trigger 24. Digital/Video Processor 104 finally scales and overlays video display information from receivers 102 and 104 onto the video stream output 111. Video stream out 111 is connected to a DVI transmitter 112 which boosts and configures the signal to be appropriate for a DVI display 114 which can be a high resolution plasma display having HDTV format.

The present invention has been particularly shown and described with respect to certain preferred embodiments and features thereof. However, it should be readily apparent to those of ordinary skill in the art that various changes and modifications ain form and detail may be made without departing from the spirit and scope of the inventions as set forth in the appended claims, in which reference to an element in the singular is not intended to mean "one and only one" unless explicitly so stated, but rather "one or more". The inventions illustratively disclosed herein may be practiced without any element which is not specifically disclosed herein.

INDUSTRIAL APPLICABILITY

The present invention addresses the shortcomings of the current art by providing a system and method for automatic switching and display of video signals. The system and method provide the functionality to intercept and modify the nature and content of such signals automatically and adapt the signals to differing video displays. The system and method are particularly suited to environments having multiple types of video interfaces and protocols. In light of the foregoing, it is contemplated that the present invention will prove highly marketable to consumers in various venues, particularly those seeking the technical functionality and features provided in the invention.

SCOPE OF THE INVENTION

Although the description above contains much specificity, it should not be construed as limiting the scope of the invention but as merely providing illustrations of some of the presently preferred embodiments of this invention. Thus the scope of this invention should be determined by the appended claims and their legal equivalents. Further, it is appreciated that the scope of the present invention encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are know to those of ordinary skill in the art are expressly incorporated herein by reference and are intended to be encompassed by the present claims. Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claim. No claim element herein is to be construed under the provisions of 35 U.S.C. 112, sixth paragraph, unless the element is expressly recited using the phrase "means for".

What is claimed is:

1. A video selection system for selectively outputting signals to an audio video (AV) output device, comprising:

a switch box configured for receiving one or more of: at least one S-video signal, and at least one composite video signal and at least one DVI signal; the switch box also being configured for receiving at least one component video signal, the component video signal including a synchronization signal, the switch box selectively outputting to the AV output device either the component video signal or one of the S-video signal or composite video signal, based on the synchronization signal, further comprising a sense signal input to the switch box, the sense signal being compared to the synchronization signal to determine whether to present the component video signal on the AV output device.

2. The system of claim 1, further comprising a sense signal input to the switch box, the sense signal being compared to the synchronization signal to determine whether to present the component video signal on the AV output device.

3. The system of claim 2, further comprising an AV receiver configured for receiving at least one of: at least one S-video input, and at least one composite video input; the synchronization signal being sent to a first input port of the AV receiver to establish a trigger signal, such that when the first input port of the AV receiver is selected, the sense signal is the trigger signal.

4. The system of claim 2, further comprising a comparator to compare the sense signal to the synchronization signal.

5. The system of claim 4, wherein the switch box comprises:
- a video decoder for receiving one of the S-video signal and composite video signal to output a transformed video signal in the component domain;
- a switch electrically connected to the video decoder for receiving the transformed video signal therefrom, the switch also receiving the component video signal, the switch output being established by either the transformed video signal or the component video signal; and
- a controller in communication with the switch for controlling the switch to establish the switch output.

6. The system of claims, wherein the controller includes the comparator, the controller further comprising:
- a valid video determiner for causing the S-video signal or composite video signal to be sent to the AV output device when the S-video signal or composite video signal is valid and the sense signal does not match the synchronization signal.

7. The system of claim 3, further comprising a remote control device associated with the AV receiver and operable to select the first input port of the AV receiver to thereby cause the AV output device to present an image generated by the component video signal.

8. A video selection system for selectively outputting signals to an audio video (AV) output device, comprising:
- a switch box configured for receiving one or more of: at least one S-video signal, and at least one composite video signal and at least one DVI signal: the switch box also being configured for receiving at least one component video signal, the component video signal including a synchronization signal, the switch box selectively outputting to the AV out device either the component video signal or one of the S-video signal or composite video signal, based on the synchronization signal, further comprising a sense signal input to the switch box, the sense signal being compared to the synchronization signal to determine whether to present the component video signal on the AV output device, further comprising a Digital/Video Processor for detecting and switching a DVI signal.

9. The system of claim 8, wherein said Digital/Video Processor further converts a analog video signal to a format compatible with the DVI format.

10. The system of claim 8, wherein said Digital/Video Processor further produces a virtual synchronization trigger signal.

11. A video selection device, comprising:
- first video input ports comprising one or more DVI ports and at least one of: one or more composite video input ports, and one or more S-video input;
- at least one component video input port;
- a video decoder electrically connected to at least one of the first video input ports, the decoder processing a video input into the component domain;
- a switch electrically connected to the video decoder for receiving the output from the decoder, the switch also being electrically connected to the component video input port; and
- a controller electrically connected to one or more of the video input ports and to the switch, the switch selectively outputting a signal from one of: a first video input port, and the component video input port, in response to the controller.

12. The device of claim 11, further comprising a video mixer in electrical communication with the switch for outputting a video signal.

13. The device of claim 11, wherein the controller receives a synchronization signal from the component video input port, the controller establishing a trigger signal based on the synchronization signal.

14. The device of claim 13, further comprising an audio video (AV) receiver configured for sending composite video signals and S-video signals to the first input ports.

15. The device of claim 14, wherein the controller receives a sense signal from one or more of the first video input ports, the controller comparing the synchronization signal to the sense signal for controlling the switch in response thereto.

* * * * *

UNITED STATES PATENT AND TRADEMARK OFFICE
CERTIFICATE OF CORRECTION

| | | |
|---|---|---|
| PATENT NO. | : 7,236,209 B2 | Page 1 of 1 |
| APPLICATION NO. | : 10/389018 | |
| DATED | : June 26, 2007 | |
| INVENTOR(S) | : Demian T. Martin | |

It is certified that error appears in the above-identified patent and that said Letters Patent is hereby corrected as shown below:

On Title Page Item 57

In the abstract, line 19: delete "fare" and replace with -- are --.

Column 9, line 33, Claim 8: delete "out" and replace with -- output --.

Signed and Sealed this

Eleventh Day of September, 2007

JON W. DUDAS
*Director of the United States Patent and Trademark Office*